United States Patent Office 3,642,743
Patented Feb. 15, 1972

3,642,743
CONTROLLED POLYMERIZATION OF MIXTURES OF VINYLIDENE CHLORIDE AND VINYL CHLORIDE IN AQUEOUS SUSPENSION
James E. Schuetz, Midland, and William D. Shelburg, Bay City, Mich., assignors to The Dow Chemical Company, Midland, Mich.
No Drawing. Continuation-in-part of abandoned application Ser. No. 586,651, Oct. 14, 1966. This application Oct. 17, 1968, Ser. No. 768,547
Int. Cl. C08f 1/11, 15/08
U.S. Cl. 260—87.7          3 Claims

ABSTRACT OF THE DISCLOSURE

This invention is directed to a process for preparing inherently processable substantially heterogeneous interpolymers of vinylidene chloride and vinyl chloride in aqueous suspension by polymerizing a monomeric mixture comprising essentially from about 70 to 90 weight percent vinylidene chloride and from about 30 to 10 weight percent vinyl chloride in a completely closed reaction vessel while controlling the temperature of such reaction vessel to maintain a constant pressure therein until a conversion of monomer to polymer of at least about 40 percent is achieved.

---

This application is a continuation-in-part of copending application Ser. No. 586,651 filed Oct. 14, 1966 (now abandoned).

In the prior known procedures for preparing relatively high molecular weight interpolymers of vinylidene chloride and vinyl chloride in aqueous suspension, the rate and extent of polymerization are generally controlled by means of temperature variation, wherein an initial relatively low temperature is used which is then raised, near the end of the reaction, to drive the polymerization to acceptable levels of conversion of monomer to polymer within a reasonable time. In such polymerization reaction, the more reactive vinylidene chloride monomer is consumed at a faster rate than the vinyl chloride monomer with resultant formation of high vinylidene chloride content material of high molecular weight. This material typically is difficultly processable, by conventional fabrication techniques, in the absence of flexibilizing additives such as plasticizers. Further, utilization of higher temperatures near the end of the polymerization reaction (to drive the reaction to completion) typically produce a high vinyl chloride content polymeric material of relatively low molecular weight. This material has been found to be readily degradable during subsequent fabrication of the so-formed polymer in the absence of thermal stabilizers and, in addition, often decomposes significantly during the polymerization process to form discolor polymeric materials of reduced strength.

It is the primary object of the present invention to provide a process for polymerizing mixtures of vinylidene chloride and vinyl chloride in aqueous suspension, whereby a polymeric material is formed which is characterized by having a high vinylidene chloride polymeric component of reduced molecular weight and a high vinyl chloride polymeric component of increased molecular weight; thereby permitting the fabrication of such polymer in the absence of either thermal stabilizers or plasticizers.

The process according to the invention is characterized in that mixtues of monomeric vinylidene chloride and vinyl chloride, where vinyl chloride is present in amount of at least about 10 weight percent and not more than about 30 weight percent based on the total amount of monomeric vinylidene chloride and vinyl chloride used, are polymerized in a closed reactor in aqueous suspension and in the presence of a polymerization initiator while under a controlled constant pressure, i.e., where the temperature of the reactor is varied to the extent necessary to maintain a constant pressure within the reactor during the polymerization reaction.

Utilization of such polymerization technique results in a reactor temperature profile which proceeds from an initial relatively high temperature (depending on the pressure selected and the composition of the monomer mixture used) to progressively lower reactor temperatures. Completion of the polymerization is indicated by a rapid rise in the temperature of the reactor interior. Polymerization products obtained using such technique are characterized by the presence of an initially formed high vinylidene chloride polymeric component of desirably low molecular weight and a subsequently formed high vinyl chloride polymeric component of desirably high molecular weight.

Such interpolymers are further characterized by being inherently processable without the addition of plasticizers, and are inherently resistant to thermal degradation during the polymerization reaction and during subsequent fabrication of the polymer by conventional means. In addition, utilization of the process of the present invention makes possible the preparation of individual batches of polymeric materials of essentially identical molecular weight distribution. This factor is extremely important when preparing interpolymers which must meet exact industrial specifications. Further, the process of this invention allows completion of the polymerization reaction in minimum time, as the pressure used may be controlled at the operating pressure limit of the polymerization reactor, thus permitting shorter reaction cycles with reduction in the exposure of the polymer to heat during manufacture. In this regard, the use of the higher temperatures at the beginning of the polymerization reaction, rather than near the end of the reaction, results in exposure of essentially only the monomeric components to such high temperatures. This fact is significant in that the monomer does not readily undergo undesirable dehydrohalogenation and that any dehydrohalogenation of such monomeric material which does occur results only in the production of acetylenic compounds which do not add to the polymer chain and which may be easily separated from the polymer formed.

In utilizing the process of the present invention the choice of monomers used, the polymerization initiator used, and the reaction pressures (and temperatures) to be employed are important.

As to the choice of monomers, the process is particularly adapted for the polymerization of interpolymers of vinylidene chloride and vinyl chloride wherein vinyl chloride is present in amount between about 10 and 30 weight percent of the total weight of the mixture of vinylidene chloride and vinyl chloride. Such monomer mixtures are necessary as a means of providing suitably varying monomer vapor pressures and reactivity ratios. It is to be understood, however, that minor amounts of other copolymerizable materials may be used, providing such materials do not substantially alter the required temperature and pressure profile which is characteristic of the process, i.e., any such additional monomeric material must be less volatile and/or be more reactive in the polymerization than the vinyl chloride constituent of the monomer mixture used. Exemplary of additional monomers which may be used in conjunction with the prescribed amounts of vinylidene chloride and vinyl chloride are: the alkyl vinyl ethers such as butylvinyl ether and the like; alkyl acrylates and methacrylates having from 1 to about 8 carbon atoms in the alkyl groups, such as methyl acrylate, ethylacrylate, propyl acrylate, butyl acrylate, and 2-ethylhexyl acrylate and their methacrylate derivatives; and the vinyl alkyl ketones such as methyl isopropenyl ketone and the like, among many others which meet the requirement of volatility and/or reactivity as previously set forth herein.

Suitable polymerization initiators include any conventional water or monomer soluble initiator which has a sufficient half life under the temperatures used in the polymerization process, i.e., initiators which remain sufficiently active to allow completion of the polymerization reaction under the conditions of temperature and pressure employed. Preferred initiators include azobisisobutyrodinitrile, the organic peroxides such as benzoyl peroxide and lauroyl peroxide and the dialkyl peroxydicarbonates such as diisopropylperoxy dicarbonate. It has further been found to be particularly desirable to use mixtures of such initiators under conditions of varying temperatures wherein such initiators may be added initially or intermittently to the polymerization reaction. The initiators are generally individually used in concentrations of from about 0.05 to 0.5 weight percent based on the weight of the reaction mixture.

The temperatures used in the process of this invention are those required to maintain a constant pressure in the polymerization reactor and/or which allow a reasonable polymerization initiator half-life. Generally, temperatures in the range of from 50° C. to 70° C. are required to maintain reaction pressures varying from about 50 to 110 p.s.i.g. More particularly, pressures of from about 90 to 105 p.s.i.g. have been found to be particularly effective when using azobisisobutyrodinitrile or benzoyl peroxide as an initiator, whereas reaction pressures ranging from about 50 to 70 p.s.i.g. are more desirable when using lauroyl peroxide or diisopropyl peroxy dicarbonate as polymerization initiators.

It is to be emphasized that the optimum conditions of temperature, and pressure will vary somewhat with relation to the monomer composition and polymerization initiator used.

The invention will be illustrated in greater detail by means of the following specific examples, where unless otherwise stated, all parts and percentages are by weight and all pressures are gauge pressures.

EXAMPLE I

To a 20 gallon, glass-lined, pressure-tight reactor was added 85 pounds of water, 0.20 pounds of a granulating agent, 76 pounds of vinylidene chloride, 19 pounds of vinyl chloride and 129 grams of azobisiobutyrodinitrile initiator. The pressure control of the reactor was set at 105 p.s.i.g. and the mixture agitated at a rate of 100 revolutions per minute with heat being applied to the reactor. The temperature of the interior of the reactor rose to a maximum of 74° C. initially and then dropped to a minimum of 51° C. over a 29 hour period. The reactor temperature then remained at 51° C. for a period of 3 hours and finally rose to a temperature of 53° C. over a succeeding 3 hour period. The reaction was then terminated resulting in a total reaction time of 35½ hours. The so-formed polymer was thermally extruded, in the absence of any additives, into an oriented film (using standard bubble techniques) having a thickness of about 0.001 of an inch. This film was colorless, had extremely good slip properties (low coefficient of friction) and had an oxygen transmission rate of 0.06 cc. per 100 square inches per 24 hours per atmosphere (tested with a differential pressure of 2 atmospheres across the film specimen).

In another embodiment of the present invention, it has been discovered that interpolymers as described herein but of somewhat higher average molecular weights may be prepared by initially polymerizing the prescribed monomeric mixtures under a constant pressure which is maintained at a value selected from the range of about 50 to 110 p.s.i.g., while in the presence of an organic peroxide polymerization initiator such as benzoyl peroxide and lauroyl peroxide, until a conversion of monomer to polymer of from about 40 to 80 percent is achieved while using a temperature in the range of about 75 to 80° C.; then discontinuing the constant pressure conditions while lowering the reaction temperature to a constant value selected from the range of between about 50 to 60° C. followed by the addition of from about 0.05 to 0.5 weight percent of a dialkyl peroxydicarbonate polymerization initiator such as diisopropyl peroxy dicarbonate; and polymerizing the reaction mixture to completion while maintaining the temperature constant. The following Example II will illustrate this embodiment.

EXAMPLE II

To a 3500 gallon glass lined, pressure tight reactor was added 14,860 pounds of water, 4.5 pounds of granulating agent, 11,620 pounds of vinylidene chloride, 2380 pounds of vinyl chloride and 40 pounds of lauroyl peroxide initiator. The pressure control of the reactor was set at 105 p.s.i.g. and the mixture agitated at a rate of 48 to 50 revolutions per minute with heat being applied to the reactor. The temperature of the interior of the reactor rose to a maximum of 75° C. initially and then dropped to a minimum of 72.5° C. over a 7 hour period. The constant pressure was then discontinued, and the temperature of the reaction was maintained at 56° C. and 7 pounds of the polymerization initiator diisopropyl peroxy dicarbonate in a xylene solution, was added. The reaction was continued while maintaining a temperature of 56° C. for a period of 42 hours during which time the pressure rose from 60 p.s.i.g. to 65 p.s.i.g. The total reaction time was 49 hours. The so-formed polymer was then thermally extruded in the absence of any additives, into an oriented film (using standard bubble techniques) having a thickness of about 0.001 of an inch. The film was colorless, had excellent slip properties (low coefficient of friction) and had an oxygen transmission rate of 0.059 cc. per 100 square inches per 24 hours per atmosphere (tested with a differential pressure of 2 atmospheres across the film specimen). This polymer was also extruded utilizing a very low plasticizer level, i.e., less than about 1 percent by weight of plasticizer into an oriented monofilament having a shrinkage in boiling water over a 1 minute period of about 5 percent.

By way of comparison, the total reaction time required for an equivalent composition using a conventional polymerization technique (wherein the reaction charge was first heated at a temperature of 57° C. which temperature was subsequently increased to about 68° C.) was 60 hours. Further, the so-formed polymer required the addition of 4.5 weight percent of a plasticizer (acetyl tributyl citrate) and 1.0 weight percent of an epoxidized soy bean oil stabilizer before it could be successfully extruded into an oriented film using the same conditions employed for fabricating the oriented film prepared from the resin produced by the process of the present invention.

By the way of further comparison, films prepared from such formulated resin were characterized by having very poor slip properties (high coefficient of friction) and oxygen transmission rates of at least about 1.0 cc. per 100 square inches per 24 hours per atmosphere; and monofilaments prepared from such resin were characterized by having a shrinkage in boiling water over a 1 minute period of at least about 10 percent.

The above examples specifically illustrate that utilization of the polymerization processes of this invention allows minimum reaction time; provides interpolymers which may be fabricated by conventional means without the use of additives such as plasticizers and heat stabilizers; and provides polymers which, in fabricated film form, have significantly improved slip and barrier properties. In addition, such interpolymers are particularly adapted for the preparation of low shrink monofilament materials.

What is claimed is:

1. A process for the preparation of inherently processable substantially heterogeneous interpolymers of vinylidene chloride and vinyl chloride in aqueous suspension, said process consisting of: polymerizing a monomeric mixture comprising essentially from about 70 to 90 weight percent vinylidene chloride and from about 30 to 10 weight percent vinyl chloride in a completely closed reaction vessel until a conversion of monomer to polymer of at least about 40 percent is achieved while controlling the temperature of said reaction vessel to maintain a constant pressure therein of a value selected from the range of 50 to 110 p.s.i.g.

2. The process of claim 1 wherein said constant pressure is maintained throughout the entire polymerization reaction.

3. The process of claim 1 wherein said constant pressure is maintained until a conversion of monomer to polymer of from about 40 to 80 percent is achieved, then discontinuing said constant pressure while maintaining a constant temperature at a value selected from the range of between about 50° C. and 60° C. while adding a dialkyl peroxy dicarbonate polymerization initiator and thereafter polymerizing to completion while maintaining said constant temperature.

References Cited
UNITED STATES PATENTS

| | | | |
|---|---|---|---|
| 2,482,771 | 9/1949 | Heerema | 260—87.5 |
| 3,033,812 | 5/1962 | Isaacs et al. | 260—31.8 |

JOSEPH L. SCHOFER, Primary Examiner

S. M. LEVIN, Assistant Examiner

U.S. Cl. X.R.

260—50, 80.75, 80.77